Dec. 3, 1946.    N. G. BAKER    2,412,028
DIESEL ENGINE
Filed March 30, 1943    2 Sheets-Sheet 1
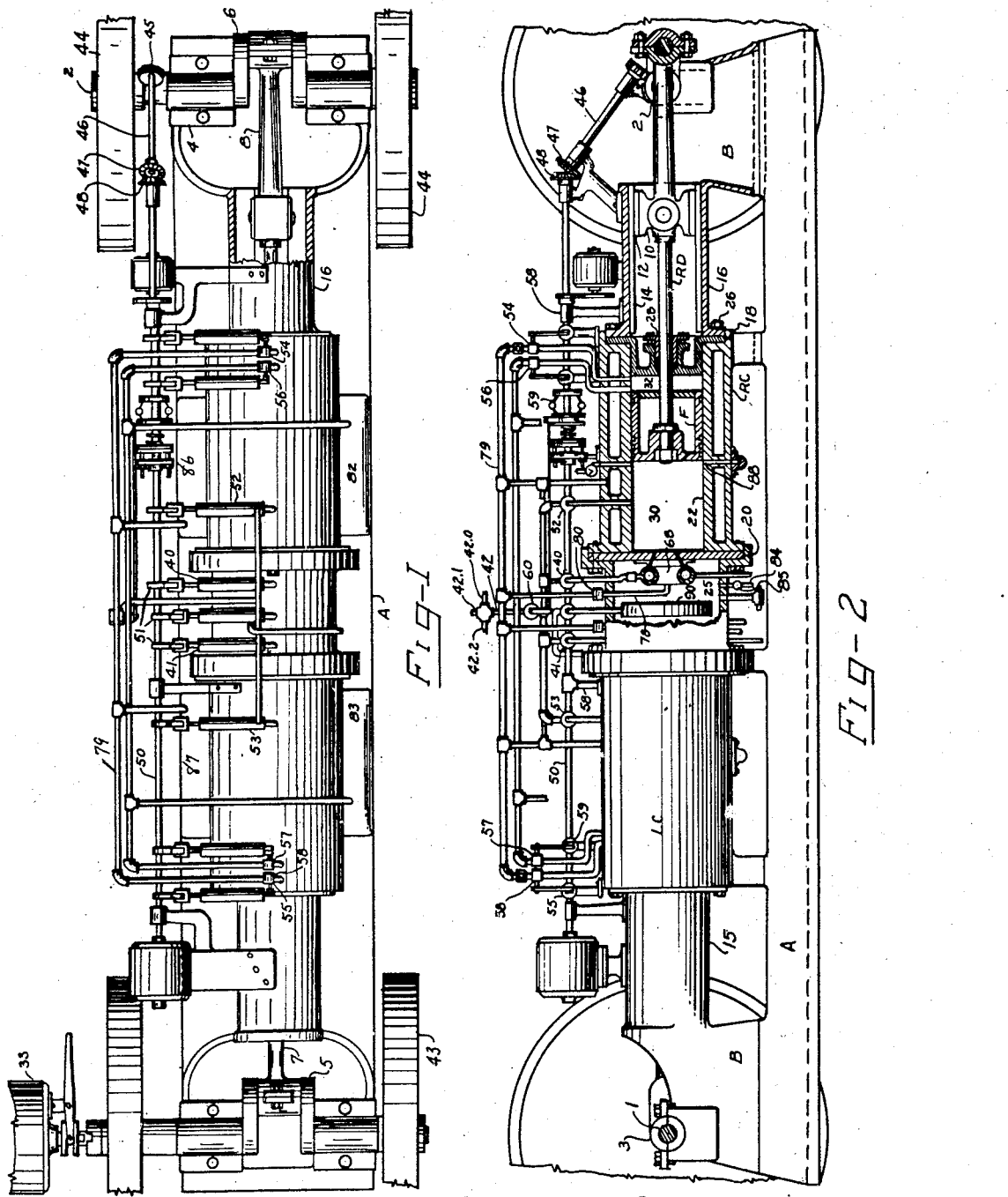
Norman G. Baker INVENTOR.
BY Bush & Bush
Attorneys.

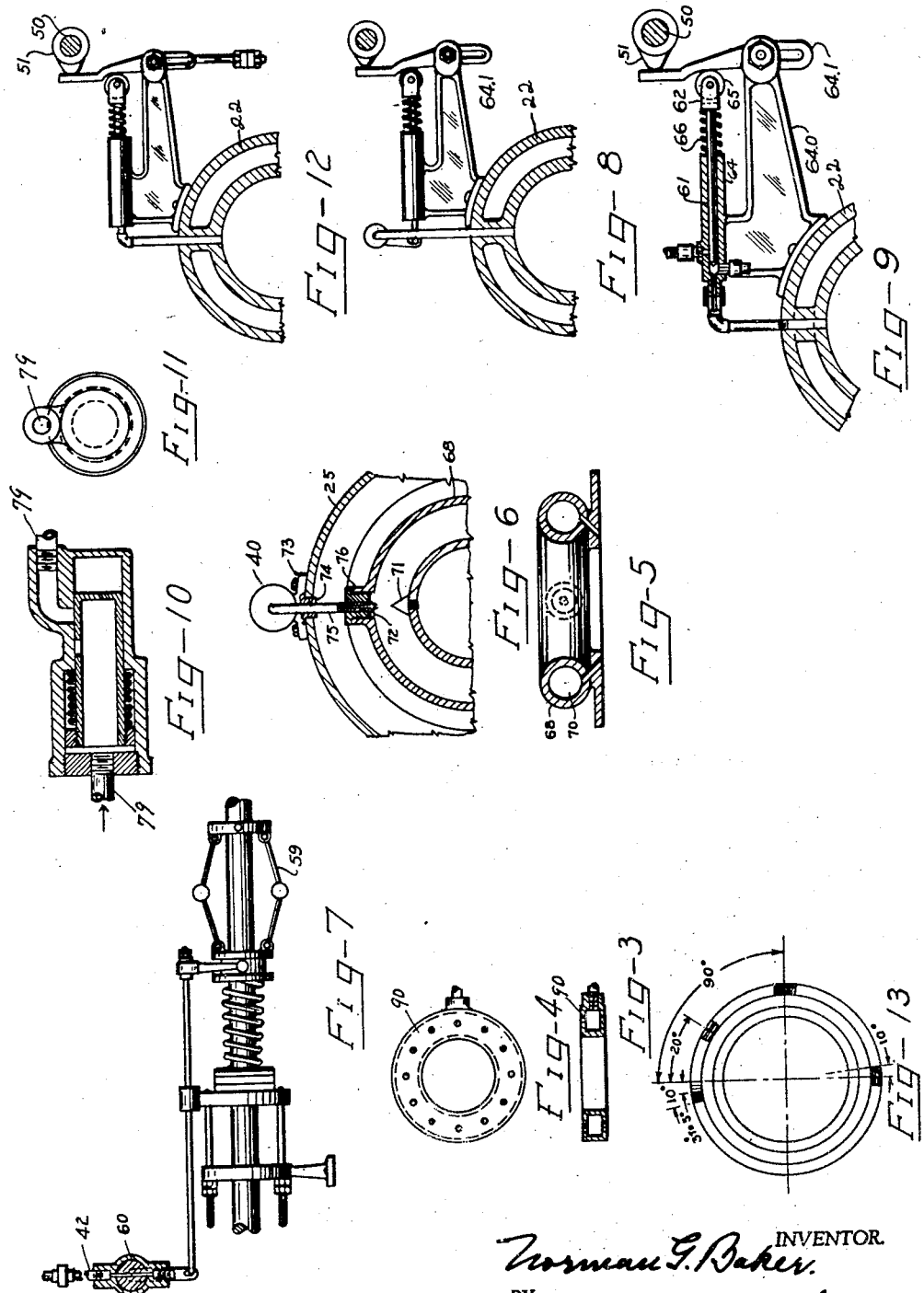

Patented Dec. 3, 1946

2,412,028

UNITED STATES PATENT OFFICE 2,412,028

DIESEL ENGINE

Norman G. Baker, Leavenworth, Kans.

Application March 30, 1943, Serial No. 481,141

10 Claims. (Cl. 123—25)

My invention relates to improvements in Diesel engines.

The objects of my invention are to provide a duplex Diesel engine having two cylinders in line axially, carrying two pistons traveling simultaneously in the same direction and which may or may not be connected by means of crossheads and connecting rods driving a crankshaft or shafts common to both pistons; to provide flash means for producing steam to increase the power of the compression stroke; to provide improved means for creating turbulence to better mix the gas and air at the time of firing; to provide means for injecting live steam into the cylinders behind the pistons in addition to injected air whereby scavenging may be hastened, the carbon in the cylinders softened, and the compression of the charge of air and gas increased; to provide an improved form and arrangement of valves and adjustable valve-actuating mechanisms to regulate the admission or discharge of air, steam, water, fuel, lubricating oil, and exhaust gases; to provide improved means for injecting an additional charge of fuel and compressed air into the cylinder intermediate the beginning and end of the power stroke; to provide means for preheating the fuel before entering the combustion chambers. Other objects will appear throughout the specification.

For convenience of reference I refer at times to the spaces between the piston heads and the front cylinder heads as the firing chambers and to the spaces behind the pistons as the pre-compression chambers; to the head of the piston adjacent the firing chamber, as the front head or firing head; to the other head of the cylinder as the rear head; to the chamber between the cylinders containing the turbulence or mixing chamber, as the flash-steam chamber; to the tank intended to receive and store live steam as hereinafter described, as the steam chest; and to the tank intended to receive the pre-compressed air, as the air chest. Other definitions will appear from the specification.

In Diesel engine building, great losses come from heating of parts all of which is lost power, from slow combustion due to failure to properly mix quickly the fuel and air. Valve springs and valves burn, lose temper, require frequent changing, carbon is troublesome, and excessive heat develops.

A disadvantage of such engines is that fifteen to twenty-five per cent of power is lost by force exerted to move the heavy pistons against a compression of four hundred and fifty to six hundred pounds or more. Power is lost by part of the burnt gases remaining in the cylinders. If a blower is connected to blow the gases out, that consumes power, and a great deal of power is lost by heat carried off by the cooling water.

One of the objects of my invention is to utilize the excess heat in the combustion area for creating high pressure steam as in a "flash steam boiler" and the steam so formed, is used to help drive the pistons on the compression stroke and also to sweep burnt gases from the cylinders in scavenging. Steam so used also softens the carbon in the cylinders and on piston heads, so it may be blown out of the cylinders by the exhaust, assuring cleaner cylinders and pistons.

It is so arranged that either air or steam or both can be used for blowing gases out to scavenge the cylinders.

My apparatus may also feed auxiliary air and fuel at the middle or during the last half of power stroke to increase the combustion and develop more power.

It is arranged so the power strokes of the pistons force the air at the rear of the pistons, into an air chest from which it is let into the cylinders for compression stroke as "pre-compressed" air.

It can be used to force pre-compressed air and fuel into the full area of the firing chamber either as a full or partial charge; and at firing or ignition time, the injector nozzle may feed more fuel to complete the charge. It has a unique turbulence area to whirl the air in opposite directions and inject the fuel into and throughout this whirling mass.

It may be arranged to spray a jet of water on the exterior parts of the turbulence chamber to create an instant flash steam pressure and to reduce excessive heat in the turbulence chamber to be regulated by the amount of water in spray and the period of spraying.

There are no valves or springs in heated areas to be damaged or have their temper drawn. By utilizing steam to assist compression, lighter pistons can be used, without blowing or cracking the piston heads, and the pistons may be formed with longitudinal partitions or flanges to strengthen the heads to further reduce the weight thereof. Through using the heat of the engine to form steam for power in pre-compression, I believe my engine will give more power per pound of weight than others.

My invention may be embodied either in upright or horizontal engines and with a single crankshaft driven by both pistons or with two crankshafts running in opposite directions for operating propellers for marine, airplane and other uses, to do away with part of the weight, bulk and cost of two engines.

It may be applied to a single cylinder and piston or to a plurality of co-axial cylinders and pistons arranged in parallel or in line, and to a single crankshaft or two crankshafts, either connected or independent.

I accomplish these objects by the mechanisms illustrated in the accompanying drawings, in which Figures 1 to 13 represent a preferred form of my invention.

Figure 1 is a top or plan view of my engine;

Figure 2 is a side elevation of my engine but with the cylinder blocks, flash chamber and some other parts in section on the line 1—1 of Figure 1, and omitting fly wheels on the near side;

Figures 3 and 4 are details of the water-spraying rings;

Figure 5 is a sectional view of one of the turbulence or firing chambers;

Figure 6 is a partial enlarged horizontal sectional detail of the turbulence chamber and fuel nozzle;

Figure 7 is an enlarged detail of the governor and fuel valve;

Figure 8 is an enlarged detail of the actuating mechanism for one of the steam or air valves;

Figure 9 is an enlarged detail of a form of pump for lubricating oil and the same type may be used for a pump for the water spray, and by reduction in size or stroke may be used for fuel injection;

Figure 10 is an enlarged sectional detail showing the air valves and connections from the pre-compression chambers to the air chest;

Figure 11 is an end view of Figure 10;

Figure 12 is a detail of the cylinder showing the position of the pumps, valves and camshaft relative thereto;

Figure 13 is a graph illustrating the points of the cycle at which the different valves open and the periods for which they remain open.

Similar numerals refer to similar parts throughout the several views.

In the preferred form, my engine comprises a base A preferably of cast iron or other suitable material which may be cast in a single unit or composed of separate pieces united by any suitable means.

The base A may be mounted upon a foundation of concrete, timbers or any other suitable mounting and no claim is being made for any particular type of foundation.

The base-plate A has united to the opposite ends thereof pillow blocks B on which extensions 15 and 16 of the cylinder blocks LC and RC are rigidly mounted and which form supports for crankshafts 1 and 2. The crankshafts may be held in place by straps or bearing caps 3 and 4 bolted to the pillow blocks B.

At the middle of the crankshafts, cranks 5 and 6 are formed on which the outer ends of connecting rods 7 and 8 are pivotally mounted.

The inner ends of the connecting rods are pivotally united to crossheads 9 and 10. The crossheads 9 and 10 are secured in guide blocks 11 and 12 which are slidable longitudinally upon ways 13 and 14 united to extensions 15 and 16 of the cylinders LC and RC.

The crossheads 9 and 10 have rigidly united thereto the opposite ends of piston rods LD and RD which pass through circular heads 17 and 18 united to the extensions 15 and 16 of the cylinder blocks.

Cylinder heads 19 and 20 may be mounted upon the ends of the cylinder blocks LC and RC respectively and may be bolted to flanges formed upon the ends of the cylinder blocks.

The cylinders LC and RC have cylindrical walls 21 and 22 formed integral therewith carrying flanges which may be bolted or otherwise united to the heads 19 and 20. A cylindrical chamber 25 is secured in line with the cylinder blocks and with the heads 19 and 20 forms a flash-steam chamber or flash boiler to provide steam as hereafter explained. In the outer ends of the cylinders heads 17 and 18 are fitted and may be secured by stud bolts 26 or other suitable means.

Bearing bushings and packing boxes 27 and 28 are mounted in the cylinder heads respectively and are provided with suitable packing rings to facilitate the movement of the pistons rods.

Pistons E and F are mounted in spaced relation upon the piston rods and the valves and pumps are so arranged and timed that the power strokes of the pistons will alternate with each other and their compression strokes will also alternate, the power stroke of one piston always being simultaneous with the compression stroke of the other piston.

My engine is preferably constructed as a two-cycle engine, but by appropriate changes in the valve mechanism, may be constructed as a four-cycle engine. When designed for use as a four-cycle engine, I prefer to double the number of pistons and cylinders so that there will be a continuous succession of power strokes for each half revolution of the crank shafts. In the two-cycle engine shown in the drawings, there will be one power stroke for each half revolution of the crankshafts.

Firing chambers 29 and 30 are formed in the inner ends of the cylinder block and pre-compression chambers 31 and 32 are formed in its outer ends adjacent the firing chambers (chamber 32 being occupied in part by piston F).

In Figure 2 I have shown only the right half of the engine in section and it is to be understood that the left half would correspond to the right half but in reversed position. In general I have used even numbers for the right half and the preceding odd numbers for the left half, many of the parts of which are concealed within the outer walls of the left cylinder, etc.

Lubrication may be accomplished by an oil pipe leading to a source of supply, with a pressure adjustable check valve in the supply line to prevent reverse movement of the fluid at ordinary pressures, and a pipe to conduct the oil to the crankshafts and thence through suitable ports to the piston ports, pistons and other parts requiring lubrication, in the manner shown in my co-pending application, or oil cups or any suitable form of oilers may be attached to the various parts as desired.

My engine may be connected with an electric starter 33 of any of the well-known forms in common use as shown in Figure 1. But an air starter may be used to supply compressed air to the respective firing chambers whereby pressure may be exerted upon the pistons in alternation to start the engine in the usual well-known way.

When using an air starter, after the piston is driven into the compression chamber, air will escape from the exhaust valve hereafter described and the air in the compression chamber will be forced into the air chest. The air supply for an air starter will be supplied by independent means under much heavier pressure than the air in the air chest which is designed to carry from 100 to 200 pounds per square inch.

When an electric starter is used, it may be geared to one or both of the crankshafts and start the engine in the usual way. With either the electric or the air starter, in case the charge does not fire in the firing chamber on the first stroke, a check valve is provided which will permit air to enter the pre-compression chamber and avoid the formation of a vacuum there when the piston starts to move in the opposite direction.

If desired, connections may be made between the compressed air starting line and the air chests with hand operated valves by which the desired amount of compressed air may be admitted to the air chest before starting the engines.

Upon the engine being started, fuel is injected into the firing chambers by the fuel pumps 40 and 41 at the proper time, the fuel pumps being supplied by a feed line 42 which may be arranged to supply either fuel oil from pipe 42.0, gasoline from pipe 42.1, or kerosene from pipe 42.2 as desired.

Flywheels 43 and 44 are mounted upon the respective crankshafts and the bevel gear 45 is mounted upon the crankshaft 2 and meshes with a corresponding bevel gear 45 upon the lower end of the shaft 46 upon the upper end of which is formed a bevel gear 47 which meshes with a corresponding gear 48 mounted upon one end of a valve and pump-actuating shaft 50. The shaft 50 has rigidly united thereto a plurality of cams 51 arranged to contact the piston rods of the fuel pumps 40, 41, 52 and 53 and to cause them to inject fuel into the turbulence chamber or into the firing chamber at predetermined intervals. Cams 51 are also arranged to actuate air valves 54 and 58 which permit air to pass to and from the air chests out of and into the pre-compression chambers 30 and 31, to actuate air valves 80 to allow air to pass to the turbulence chambers, and also to actuate valves 56 and 57 which control the admission of steam from the steam chest to the pre-compression chambers, all at predetermined intervals.

The camshaft 50 may be mounted upon suitable supports 58 mounted upon the cylinder block. A governor 59 of the centrifugal ball or other suitable type, may be mounted upon the cam shaft 50 to actuate a valve 60 in the fuel supply line 42 and may operate in the usual well-known manner.

An enlarged detail of one of the fuel pumps 40 is shown in Figure 9 having a pump shaft 61, and a barrel or cylinder 64 carried by a bracket 64.0. The outer end of the pump shaft is forked 62 to carry a flanged roller 65 to contact an adjustable lever 64.1 pivoted upon the bracket 64.0 in continuous contact with the cam 51 whereby the pump shaft may be actuated at each revolution of the cam shaft. A spring 66 is mounted upon the pump shaft 61 to hold the roller 65 in contact with the lever 64.1 at all positions. The cam lever 64.1 is slotted at its lower end so as to be adjustable to vary the throw of the pump shaft and to regulate the amount of fuel at each stroke.

Similar pumps are utilized for pumping water to the flash steam chamber and for pumping lubricating oil to the lubricating system, the bore and stroke of which may be varied as desired.

In order to provide a thorough mixture of the fuel oil with the compressed air, I provide annular tubular turbulence chambers 68 suitably united to or formed integral with the heads 20 carrying an annular opening 70. The inner wall of the turbulence chamber is provided with a conical projection 71 adjacent the opening of the spray nozzle 72 through which fuel is injected into the annular opening 70 from the pump 40 and the size of the turbulence area will be proportional to provide the necessary amount of compression to fire the charge.

Fuel pumps 40 and 41 are mounted upon plates 73 formed integral with sleeves 74. The opening in the wall of the steam flash chamber 25 into which the sleeve 74 projects and through which the injection pipe 75 passes to the nozzle 72, is preferably formed somewhat larger than the sleeve 74 so as to permit sufficient movement of the flange plate 73 to accommodate a limited adjustment which may be necessary to seat the pipe 75 firmly in the boss 76 formed upon the turbulence chamber 68. The other turbulence chamber and feed pipe is similarly arranged.

Air pipes 78 have their inner ends opening into the turbulence chambers and air from the air line 79 may be supplied to the turbulence chambers to scavenge the burnt gases and to mix with the fuel charge in the turbulence chambers when fresh fuel is injected. Valves 80 are mounted in the lines 78 and actuated by cams upon the cam rod 50 as heretofore explained.

Steam chests 82 and 83 may be mounted upon the outside of the cylinders or upon the base and a supply pipe 84 leads from the flash steam chamber to these steam chests, with a valve 85 mounted therein by which the steam may be shut off.

Compressed air chests 86 and 87 are mounted upon the cylinders or base and connected by the pipe 79 with the compression chambers, with the valves arranged to permit compressed air from the pre-compression chambers to travel to the air chests during the power stroke of the corresponding piston and to pass from the air chest to the pre-compression chamber on the return stroke of the piston.

At the end of the power stroke of either piston, exhaust ports 88 are opened and the burned gases are allowed to escape to a suitable muffler or exhaust manifold of any of the types in common use.

As an auxiliary source of power for compressing the charge of air or of air and fuel, I provide a water sprayer 90 (see Fig. 4) which is mounted centrally within the steam flash chamber and arranged to throw a spray of water upon the turbulence chambers, the turbulence chambers being heated by the firing of the charges therein will cause the spray of water to flash into steam and this stream is arranged to be piped to and admitted to the pre-compression chambers to assist in forcing the pistons forward to compress the fresh charges of air therein and also may be utilized to soften any carbon accumulating in the firing chambers or in the turbulence chambers.

My engine may be connected with an electric or any of the forms of starter in common use as shown in Figure 1. A compressed air starter may be used in which case pipes will lead to the firing chambers whereby pressure may be exerted upon the pistons in alternation to start the engine in the usual way.

After the engine is started, fuel is injected into the firing chambers by the fuel pumps.

A centrifugal governor as shown in Figure 7 may be utilized to regulate the fuel feed, the governor and valve to be so arranged that when a predetermined speed has been reached, the governor will act to reduce the amount of fuel permitted to pass to the turbulence chambers or firing chambers.

It has been found that there is a tendency for the power over the piston to drop as it approaches the end of its power stroke. In order to prevent this dropping of power and to augment the power toward the end of the stroke, I provide pumps 52 and 53 for injecting into the firing chamber an additional charge of air and fuel or of air or fuel alone after the piston reaches about the middle of its travel on the power stroke or is near the end of the stroke, which will increase combustion and thus give additional and more steady power, saving fuel by preventing the exhaust of unburnt gases.

Auxiliary air pumps may be added to be driven by the crankshafts or by the crossheads in order to insure a supply of compressed air in the air chests at any desired degree of pressure.

Many modifications may be made in the size, form and arrangement of different parts without departing from the spirit of my invention and I do not limit my claims to the precise forms shown in the drawings.

I claim:

1. An internal combustion engine comprising a base, a pair of closed cylinders mounted thereon in axial alignment, each having front and rear heads, a firing chamber and a pre-compression chamber in the cylinders respectively with piston rods extending through the rear heads and arranged to drive crankshafts, an intermediate chamber between the front heads, turbulence chambers in said intermediate chamber united to the front heads wherein compressed air and fuel may be mixed, open ports from the turbulence chambers and through the heads into the firing chambers to admit the firing charges into the firing chambers respectively prior to, during and following ignition, and a system of pumps and valves actuated indirectly by the crankshafts to force and control the admission of air and fuel to the turbulence chambers and to exhaust the burnt gases at or near the end of the power stroke.

2. An internal combustion engine comprising a base, a pair of closed cylinders mounted thereon in axial alignment each having front and rear heads and a firing chamber and a pre-compression chamber, pistons mounted in the cylinders respectively with piston rods extending through the rear heads and arranged to drive crankshafts, an intermediate chamber mounted upon the front heads, turbulence chambers united to said front heads wherein compressed air and fuel may be mixed, ports from the turbulence chambers and through the firing heads into the firing chambers to admit the firing charges into the firing chambers respectively just prior to, during, and following ignition, and means actuated indirectly by the crankshafts to force and control the admission of air and fuel to the turbulence chambers and to exhaust the burnt gases at or near the end of the power stroke.

3. An internal combustion engine as described in claim 1 and means to synchronize the movement of the pistons in both directions.

4. An internal combustion engine as described in claim 1, and means to inject a spray of water upon the heated turbulence chambers in alternation at intervals as described whereby it may be flashed into steam usable to assist in compressing the next change of air in the firing chambers.

5. An internal combustion engine as described in claim 1, and a pump to inject a spray of water upon the heated turbulence chambers at alternating intervals whereby it may be flashed into steam in the intermediate chamber, said cylinders being water jacketed for cooling, and connections whereby cool water from an independent source of supply is conducted into the water jacket and hot water drawn from the water jacket by the spray pump.

6. An internal combustion engine as described in claim 1, and means as described to synchronize the movement of the pistons in both directions.

7. An internal combustion engine as described in claim 1, and means as described to synchronize the movement of the pistons in both directions, and means as described to inject a spray of water upon the heated turbulence chambers at corresponding intervals whereby it may be flashed into steam.

8. An internal combustion engine as described in claim 1, and means as described to synchronize the movement of the pistons in both directions, a pump to project a spray of water upon the turbulence chambers at predetermined intervals, said cylinders being water-jacketed for cooling, and connections whereby cool water from an independent source of supply is conducted into the water jacket and hot water drawn from the water jacket to the spray pump.

9. In an internal combustion engine, the combination with a pair of cylinders in axial alignment, of an intermediate chamber mounted between them, of pistons mounted in the cylinders, means to cause the pistons to travel simultaneously in each direction, means in the intermediate chamber for mixing charges of compressed air and fuel separately, means to inject such mixed charges into the respective cylinders at the time of firing same, and means to exhaust and scavenge the cylinders after each explosion and to supply fresh air to the cylinders just prior to the beginning of the compression stroke.

10. In an internal combustion engine, the combination as set out in claim 9, the means for mixing the charges of air and fuel including turbulence chambers substantially as described, spraying means for spraying the heated turbulence chambers with fine jets of water whereby flash steam may be formed and means to utilize the steam so formed to aid in driving the pistons during their compression strokes.

NORMAN G. BAKER.